Patented Mar. 1, 1927.

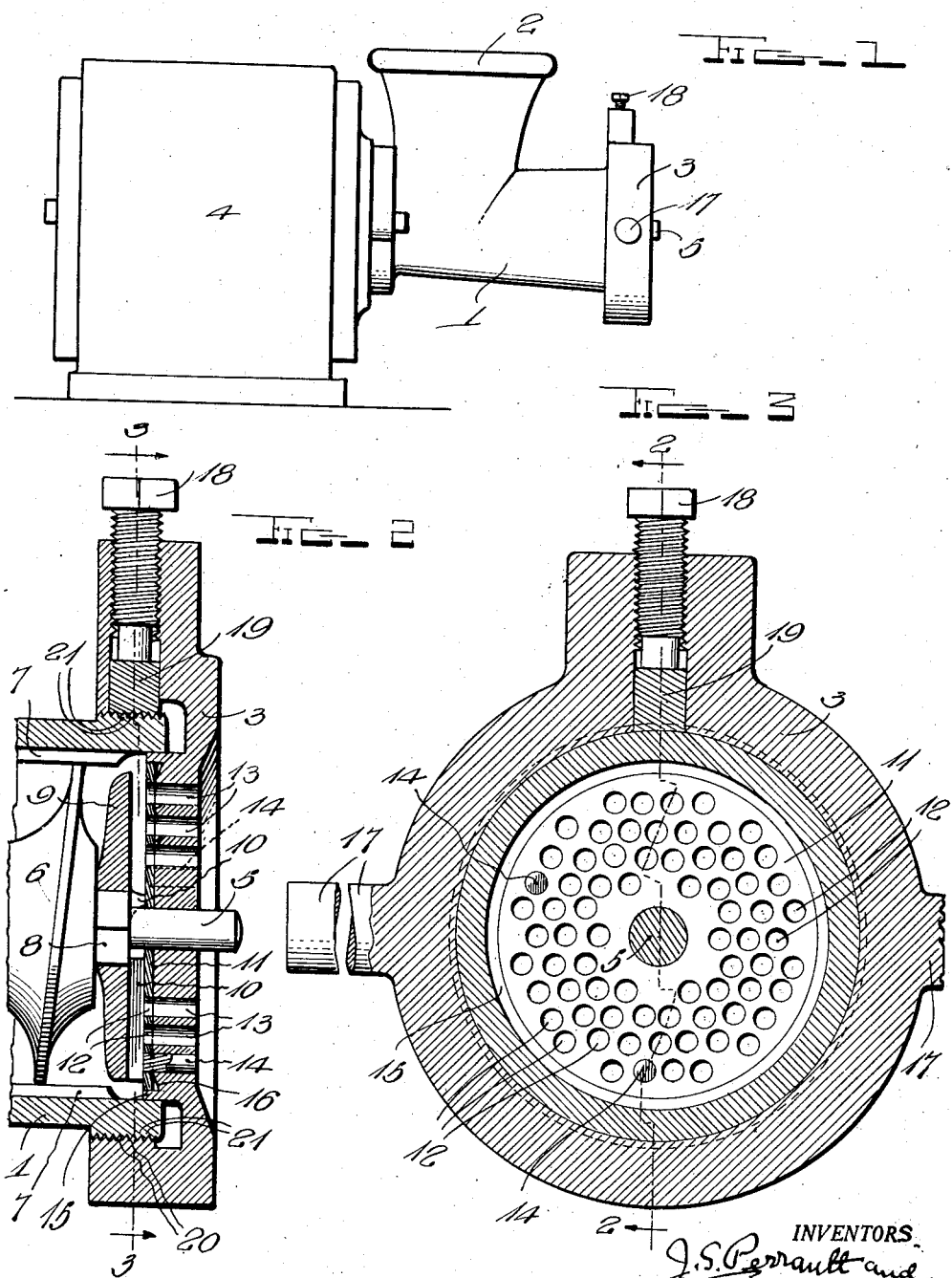

1,619,632

UNITED STATES PATENT OFFICE.

JOSEPH S. PERRAULT AND JOSEPH T. MARQUIS, OF NASHUA, NEW HAMPSHIRE.

MEAT-GRINDER HEAD.

Application filed April 21, 1925. Serial No. 24,836.

Our present invention pertains to meat grinders and it contemplates the provision of a device of the character set forth that comprises but a minimum number of elements and one that is sanitary as well as easily operated and maintained.

The invention further contemplates the provision of a meat grinder so constructed and arranged that the nut and follower employed are formed of a single piece and the grinder plate used in the device is reversible.

Other objects and advantages of the invention will be fully understood from the following description and claim when the same are read in connection with the drawings accompanying and forming part of this specification, in which—

Figure 1 is a side elevation of a motor with grinder head attached thereto.

Figure 2 is a sectional view taken centrally of a portion of the grinder head and on the plane indicated by the line 2—2 of Figure 3.

Figure 3 is a transverse vertical section taken in the plane indicated by the line 3—3 of Figure 2.

Similar numerals of reference designate corresponding parts in all the views of the drawings.

Our novel device comprises the grinder head indicated as a whole by 1 and threaded on said head is a discharge mouth 3 while at 2 is shown the feed mouth. Secured to and arranged adjacent the head 1 is a motor 4, while passing through the hollow body portion of the head 1 is a shaft 5 on which is arranged the helical cutting member 6. This cutting member is provided with a series of spiral blades that engage coacting ribs 7 formed internally of the body 1 and adjacent the first cutting member 6 and formed on the shaft 5 is a square end 8. Adapted to seat over the square end 8 is a cutter 9 having the cutting edges 10. Threaded on the body 1 is the plate 3 that comprises an integral foraminous portion or disk 11 having the openings 12 and adapted to coact with the foraminous disk 11 are a series of holes 13 formed in the head 3. A series of dowel pins are provided at 14 to secure the foraminous portion of the mouth 3 in proper position, while the head is provided adjacent the foraminous body with an extension 15 that acts as a housing for the foraminous portion. The head or mouth portion 3 is under-cut as indicated at 16 to assure positive seating while formed exteriorly on the mouth 3 are handles 17 for adjusting the mouth with respect to the body 1.

Mounted on the mouth 3 is a set screw 18 that engages a block 19 to prevent casual displacement of the mouth during operation of the device and acts as a lock. This block is preferably formed of brass and engages threads 20 of the head while at 21 we have shown the threads of the body portion.

In the practical use of the invention, the shaft is properly positioned in the head 1 with the square end of the shaft directed outward. The cutter plate 9 is then positioned on the square end of the shaft after which the foraminous disk is placed on the shaft next to the cutter plate. The mouth 3 is then threaded on the body 1 and the set screw adjusted to preclude liability of casual displacement. We would have it distinctly understood that the cutter plate 9 is reversible and that the nut and follower are in one piece.

The invention when employed in connection with the motor is well adapted for the grinding of meats regardless of the texture thereof and at the same time because of the reversible construction of the plate, assembly of the device will be accomplished without employing skilled labor.

Having described our invention, what we claim and desire to secure by Letters-Patent is:—

In a meat grinder including a hollow cylindrical body with feeding and discharging openings, a foraminous plate adapted to be seated over the discharge opening, said plate having an annular rib and being undercut on the inside of the rib, and having its perforations in register with those of the disc.

In testimony whereof we have hereunto set our hands.

JOSEPH T. MARQUIS.
JOSEPH S. PERRAULT.